United States Patent
van den Akker

(10) Patent No.: US 9,156,340 B2
(45) Date of Patent: Oct. 13, 2015

(54) ENERGY STORAGE DEVICE PROTECTION APPARATUS

(75) Inventor: Simon van den Akker, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 637 days.

(21) Appl. No.: 13/350,241

(22) Filed: Jan. 13, 2012

(65) Prior Publication Data

US 2012/0183828 A1    Jul. 19, 2012

(30) Foreign Application Priority Data

Jan. 13, 2011 (DE) .......................... 10 2011 002 650

(51) Int. Cl.
*B60K 1/04* (2006.01)

(52) U.S. Cl.
CPC ........... *B60K 1/04* (2013.01); *B60K 2001/0438* (2013.01)

(58) Field of Classification Search
CPC ............. B60K 2001/0416; B60K 1/00; B60K 2001/0438; H01M 2/10
USPC ........ 429/100; 180/68.5, 218, 54.1, 274, 65.1
See application file for complete search history.

(56) References Cited

U.S. PATENT DOCUMENTS

| | | | | |
|---|---|---|---|---|
| 1,433,161 A | * | 10/1922 | Smith et al. .................. | 180/311 |
| 2,988,128 A | * | 6/1961 | Van Pappelendam .......... | 72/176 |
| 6,276,044 B1 | * | 8/2001 | Ragland et al. ................. | 29/521 |
| 2001/0030069 A1 | | 10/2001 | Misu et al. | |
| 2003/0021648 A1 | * | 1/2003 | Herring ......................... | 410/106 |
| 2004/0001946 A1 | * | 1/2004 | Ma et al. ..................... | 428/317.9 |
| 2008/0245753 A1 | * | 10/2008 | Spriegel et al. .............. | 211/85.7 |
| 2008/0264026 A1 | * | 10/2008 | Ishii et al. ...................... | 56/10.8 |
| 2009/0011210 A1 | * | 1/2009 | Gao et al. ....................... | 428/220 |
| 2009/0226806 A1 | * | 9/2009 | Kiya .............................. | 429/186 |
| 2010/0156162 A1 | * | 6/2010 | Sweers et al. ............... | 297/452.2 |
| 2010/0263954 A1 | * | 10/2010 | Constans .................... | 180/89.12 |
| 2011/0262799 A1 | * | 10/2011 | Kim ............................... | 429/156 |
| 2012/0031695 A1 | * | 2/2012 | Tsuchiya et al. ............. | 180/68.5 |
| 2012/0037437 A1 | * | 2/2012 | Fernandez-Mateo ........ | 180/65.1 |

FOREIGN PATENT DOCUMENTS

| | | | | |
|---|---|---|---|---|
| EP | 1 992 513 A1 | | 11/2008 | |
| WO | WO 2010/125602 | * | 4/2010 | ............. B62D 25/20 |
| WO | WO 2010/076457 | * | 7/2010 | ............... B60K 1/04 |

OTHER PUBLICATIONS

RealDictionary (Flange entry, Available May 23, 2003 {http://www.realdictionary.com/?q=flange}).*
RealDictionary (Fixed entry, Available May 23, 2003 {http://www.realdictionary.com/?q=fixed}).*
Anderson (The Strength of Materials and Structures, p. 43, D. Appleton and Co. New York, New York 1872; library cataloged Jun. 20, 1917).*

(Continued)

*Primary Examiner* — Patrick Ryan
*Assistant Examiner* — Aaron Greso
(74) *Attorney, Agent, or Firm* — Raymond L. Coppiellie; Brooks Kushman P.C.

(57) ABSTRACT

The invention relates to a motor vehicle, in particular a hybrid automobile or electric vehicle, having a battery that is arranged between two wheelhouses An oblong protective element that resists buckling in the event of a compression load is provided between the wheelhouses in the region of the battery in the event of a side impact.

14 Claims, 4 Drawing Sheets

(56) References Cited

OTHER PUBLICATIONS

Frey et al. ("In-Use Measurement of the Activity, Energy Use, and Emissions of a Plug-in Hybrid Electric Vehicle" Paper 2009-A-242-AWMA, Proceedings, 102nd Annual Conference and Exhibition, Air & Waste Management Association, Detroit, Michigan, Jun. 16-19, 2009).*

Webster's (Lug and Luggage entries—p. 413, Webster's Secondary-School Dictionary 1913 Merriam Co NY).*

* cited by examiner

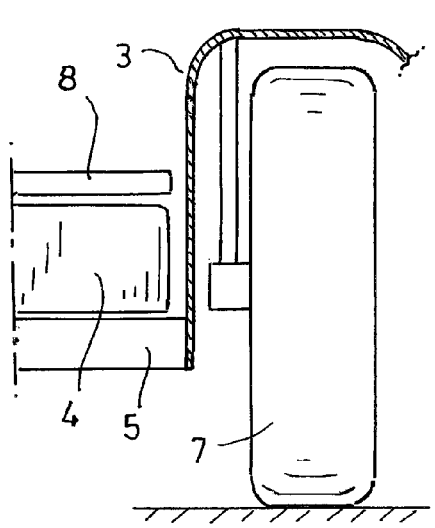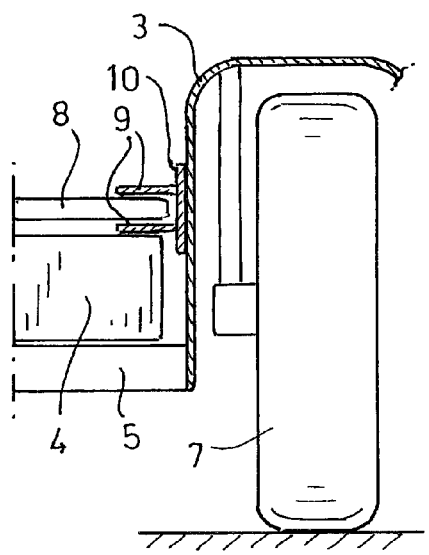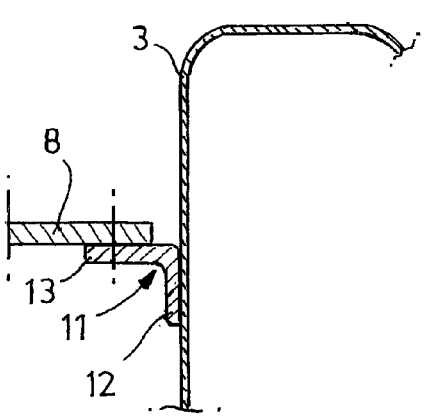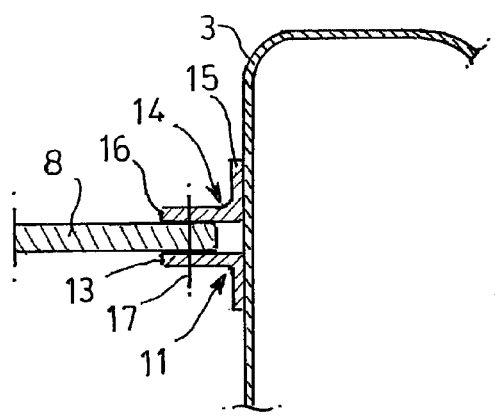

ENERGY STORAGE DEVICE PROTECTION APPARATUS

CROSS-REFERENCE TO RELATED APPLICATIONS

This application claims foreign priority benefits under 35 U.S.C. §119(a)-(d) to 10 2011 002 650.9, filed Jan. 13, 2011, which is hereby incorporated by reference in its entirety.

TECHNICAL FIELD

This disclosure relates to a hybrid vehicle or electric vehicle having an energy storage device that is arranged between two wheelhouses.

BACKGROUND

Lithium-ion accumulators are suitable as batteries for hybrid automobiles and electric vehicles because they offer high energy density, are thermally stable and are not subject to memory effect. On the other hand, lithium-ion accumulators are sensitive to mechanical stresses because, mechanical damage can very easily lead to internal short circuits. Lithium-ion accumulators must be protected from mechanical stresses when installed in a vehicle.

A mechanism that protects a battery arranged in the region of the rear luggage compartment is disclosed in EP 1 992 513 A1. In the '513 application, the front region of the battery is located on a cross member arranged rigidly between the two side members of the vehicle. The battery and cross member are connected by screws that pass through slots running in the longitudinal direction of the vehicle. In the event of a collision in which the side members are deflected upwardly, the battery can be displaced relative to the cross member. The rear part of the battery is connected to the side members by pivoted levers that permit relative movement between battery and side member in the event of a collision. Although this known mechanism may provide protection of the battery in rear-end collisions, it offers no protection at all against a side impact.

A cover element for a battery arranged in a luggage compartment is known from US 2001/0030069 A1. However, this cover element serves only to ensure a cooling channel for the battery. This cover element is not provided or designed for load absorption in the event of a crash.

This disclosure is directed to the above problems and other problems as summarized below.

SUMMARY

According to one aspect of this disclosure, a protective element is provided for a battery arranged between two wheelhouses in a hybrid or electric motor vehicle.

An oblong protective element is provided between the wheelhouses in the region of the battery that does not buckle in the event of a lateral compression load.

The protective element forms a lateral load path between two wheelhouses that counteracts inward displacement and/or rotation or tilting of the wheelhouse. The load path guides the crash load past the energy storage device to eliminate or considerably reduce a compression load acting on the energy storage device in the event of a collision.

Energy storage devices should be understood here to mean all devices that store and/or convert energy, such as batteries, compressed gas tanks, liquid gas tanks, gasoline tanks, and sensitive energy systems such as current transformers, fuel cells, etc.

The protective element may also serve as a battery cover and/or as a loading floor of the luggage compartment because of its positioning, stiffness and strength.

The protective element is preferably arranged above the battery. The battery is arranged between the floor panel on its underside and the protective element on its upper side that protect the battery.

The battery is arranged in the luggage compartment of a vehicle with a luggage compartment located at the rear and the protective element is located between the two rear wheelhouses.

The protective element may be fixed with regard to its vertical position in the region of the wheelhouses so that it is not displaced in the event of a side impact, and consequently always occupies the optimum position. The protective element may be arranged freely and have no rigid connection to the wheelhouses between which it is arranged. Alternatively, however, it is possible to connect the protective element to the wheelhouses between which it is arranged.

A sandwich panel extending between the respective two wheelhouses may be used as the protective element. The sandwich panel may consist of two face sheets with a core of rigid foam. The rigid foam made from a foamed plastics material may also be replaced by a metal foam, for example an aluminum foam.

Alternatively, the sandwich panel may consist of two face sheets enclosing a core of corrugated sheet metal, the corrugation line of the core extending transversely to the longitudinal axis of the sandwich panel. Such sandwich panels are commercially available, for example under the trade name Metawell®.

The protective element may also be in the form of a homogenous profile section having high resistance to buckling.

Alternatively, the protective element may be in the form of a closed hollow profile section, for example a tubular or box section. However, the protective element may also be in the form of an open profile section, for example a T-beam, an I-beam, a U-section, a V-section or the like.

The protective element may have both closed and open profile regions from which an overall profile section can be combined.

The protective element may also be in the form of a pressing or a deep-drawn part that can be better adapted to the geometry of the luggage compartment.

The protective element preferably has flanges with which it is fastened to a floor panel of the vehicle. These flanges may be configured as a part of a profile section, as separate parts or as portions of a deep-drawn part. The large-area connection to the floor panel of the vehicle produces a very stiff protective cover for the battery.

The protective element may be fixed in its central region by means of separate support arms to increase the stiffness of the protective element. A central region of the protective element may be fastened to the battery.

The above features and aspects of this disclosure will be better understood in view of the attached drawings and the following detailed description of the illustrated embodiments.

BRIEF DESCRIPTION OF THE DRAWINGS

FIG. 4 shows an exemplary embodiment in which the protective element is not connected to the wheelhouse;

FIG. 5 shows an exemplary embodiment in which the protective element is fixed vertically relative to the wheelhouse without, however, being rigidly connected to the wheelhouse by means of a force-transmitting element;

FIG. 6 shows an exemplary embodiment of a fixing of the protective element to the wheelhouse;

FIG. 7 shows a further exemplary embodiment of a fixing of the protective element to the wheelhouse;

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
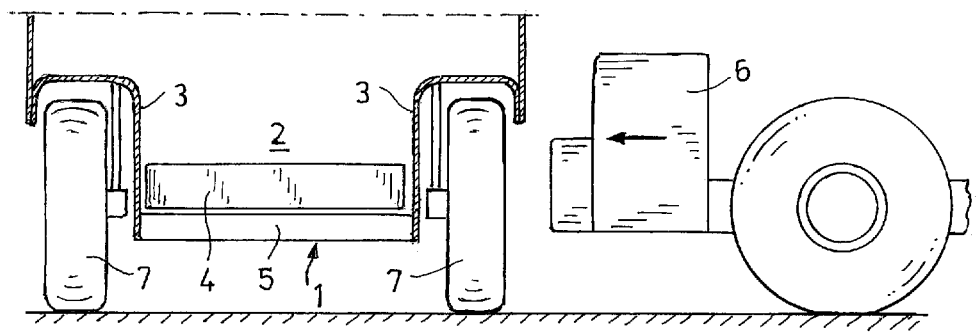
FIG. 1 shows a prior art arrangement of a battery in a rear luggage compartment without the protective element according to the invention.
Figure 2:
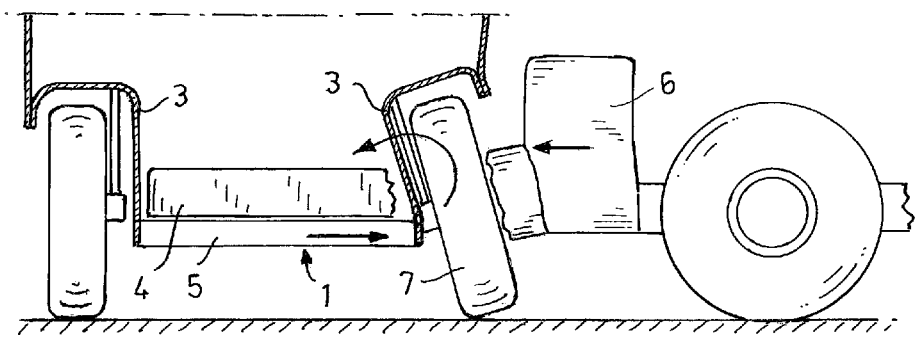
FIG. 2 shows the prior art arrangement of FIG. 1 in the event of a side impact in which the rear wheel of the vehicle including the wheelhouse is rotated or tilted inwards.

FIGS. 1 and 2 show the state of the art. In a hybrid automobile or an electric vehicle 1 a relatively wide battery 4 is arranged in the rear luggage compartment 2 between the wheelhouses 3, the battery 4 being, as a rule, a lithium-ion accumulator. The battery 4 is fastened to the floor panel 5.

In the event of a side impact, as represented in FIG. 2, in which another vehicle 6 collides laterally with the rear part of the vehicle 1, the corresponding rear wheel 7 together with the wheelhouse 3 surrounding it is rotated or tilted inwards.

At the beginning of the crash the corresponding rear wheel 7 first comes into contact with the floor panel 5 and then rotates about this contact region with its upper part against the battery 4, so that the latter is damaged or destroyed, as shown in FIG. 2. As already mentioned, this can lead to internal short-circuits within the battery.

Figure 3:
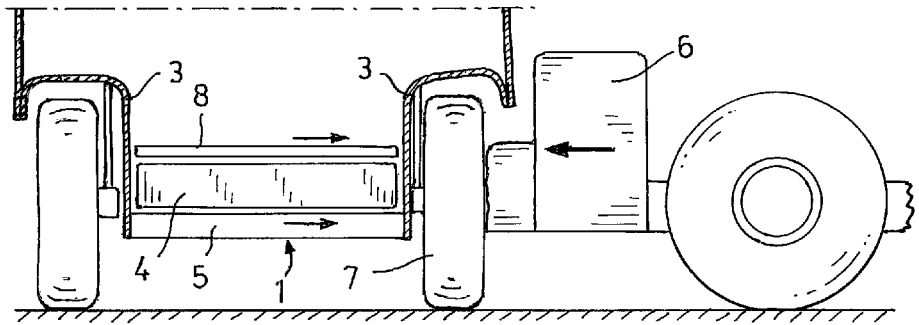
FIG. 3 shows an exemplary embodiment including the disclosure protective element showing the battery remaining undamaged in the event of a side impact.

As shown FIG. 3, an oblong protective element 8 is arranged above the battery 4, bridging the intervening space between the wheelhouses 3. The protective element 8 is very stable and has high resistance to buckling.

Accordingly, as can be seen especially from FIG. 3, the battery 4 is embedded between the floor panel 5 and the protective element 8 arranged above it. In the event of a side impact, the wheel 7 and the associated wheelhouse 3, are prevented from rotating inwardly by the protective element 8 that opposes rotating movement of the wheelhouse 3 and of the rear wheel 7. The battery 4 is protected and in the event of the side impact represented is undamaged or less damaged.

FIG. 4 shows an exemplary embodiment in which the protective element 8 is not connected to the wheelhouse 3. A connection to the wheelhouse 3 is not essential because in the event of a side impact the wheelhouse 3 and the wheel 7 come into abutment against the protective element 8. The protective element 8 can reliably produce its effect even without an additional attachment.

In the exemplary embodiment shown in FIG. 5, the protective element 8 is fixed vertically relative to the respective wheelhouse 3, but without being connected rigidly to the wheelhouse 3. In this case the end of the protective element 8 adjacent to the wheelhouse 3 is connected to a load transfer element 10 by means of the two horizontal limbs 9 thereof. The load transfer element 10 is configured to bear against the wheelhouse 3 in the event of a cash and effects a uniform transfer of load to the protective element 8.

In the exemplary embodiment shown in FIG. 6, the protective element 8 is not only fixed vertically but is also connected to the wheelhouse 3. An angle section 11, one limb 12 of which is connected to the wheelhouse 3, serves as the connection, while the protective element 8 rests on the projecting limb 13 and is fastened to the projecting limb 13, for example, by screws, or the like. The angle section 11 may be, for example, an extruded profile section, a folded section or a deep-drawn part.

In the exemplary embodiment shown in FIG. 7, an even somewhat more stable fixing of the protective element 8 to the wheelhouse 3 is represented. In addition to the angle section 11 on which the protective element 8 rests, a further angle section 14 is provided that is arranged mirror-symmetrically to the angle section 11. One limb 15 of the angle section 14 is fastened to the wheelhouse 3, while the other limb 16 is located directly above the protective element 8. The lateral edge of the protective element 8 is disposed between the limb 16 of the upper angle section 14 and the limb 13 of the lower angle section 11. The protective element 8 is rigidly connected to the wheelhouse 3 by means of fastening elements 17, for example, screws.

Many diverse embodiments of the protective element 8 are possible. What is important in their construction, however, is that the protective element 8 has high resistance to buckling, so that a rigid load transfer is possible.

Figure 8:
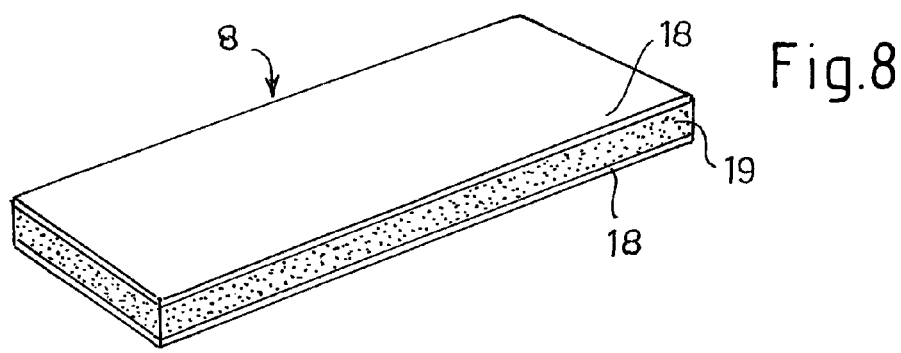
FIG. 8 is a perspective view of a first exemplary embodiment of a protective element.

FIG. 8 shows a first exemplary embodiment of such a protective element 8. In this case the protective element 8 consists of a sandwich panel comprising two outer face sheets 18 and a core 19 of rigid foam. Such sandwich panels are known per se.

Figure 9:
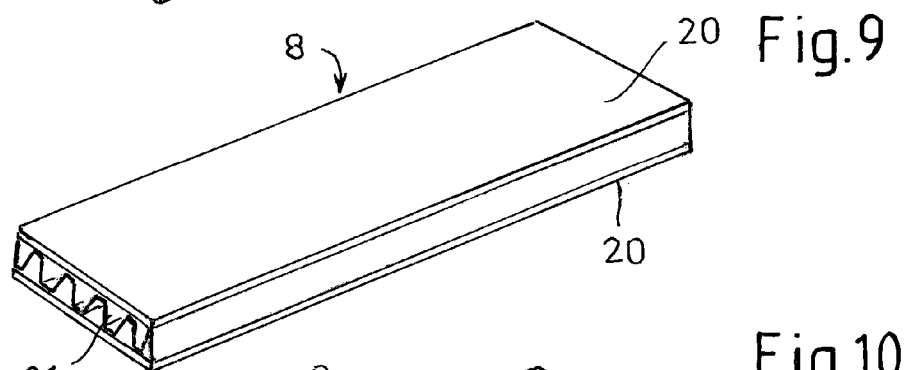
FIG. 9 shows a second exemplary embodiment of a protective element.

Alternatively, as shown in FIG. 9, the sandwich panel may have a different structure. According to FIG. 9, the sandwich panel 8 again consists of two face sheets 20 between which is arranged a core 21 of corrugated sheet metal. Such sandwich panels are marketed under the trade name Metawell®.

Figure 10:
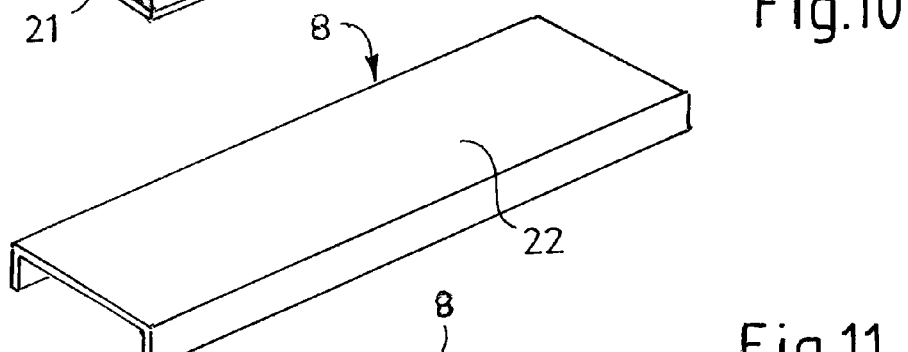
FIG. 10 shows a third exemplary embodiment of a protective element.
Figure 14:
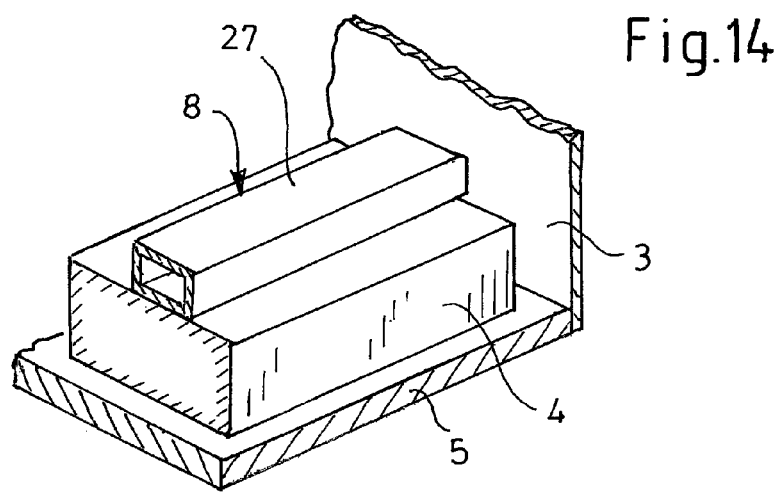
FIG. 14 shows an exemplary embodiment of the protective element that is arranged above the battery and is provided with a closed profile.

As shown in FIG. 10, the protective element 8 may also be in the form of a U-shaped beam 22 has an open profile section. Other forms of beam, for example T-beam, I-beam, V-section, etc., are possible, provided that the selected profile has sufficient resistance to buckling. In addition, closed profile sections not shown in the drawing, for example tubular or box sections, are suitable, as shown in FIG. 14 and described below.

Figure 11:
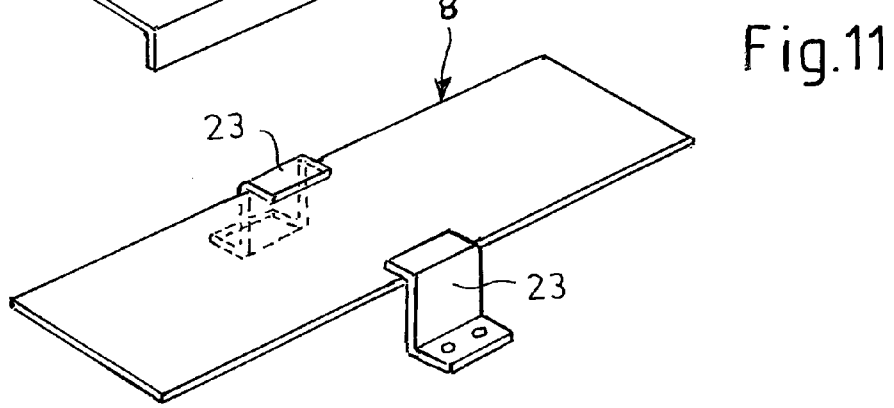
FIG. 11 shows an exemplary embodiment of a protective element with a central fixing.

As shown in FIG. 11, embodiments in which the protective element 8 is fixed by means of separate support arms 23 are also possible. The support arms 23 fix the central region of the protective element 8, so that buckling of the protective element can be effectively counteracted. With this construction, weaker protective elements 8 may be used because a lower resistance to buckling is compensated by the support arms 23.

Figure 12:
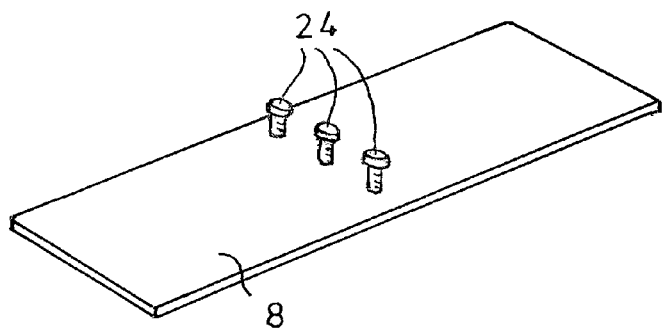
FIG. 12 shows an exemplary embodiment of the protective element fastened to the battery.

As shown in FIG. 12, the protective element 8 may also be fastened directly to the battery. In this case, screw connections 24 fasten the central region of the protective element 8 to the battery.

Figure 13:
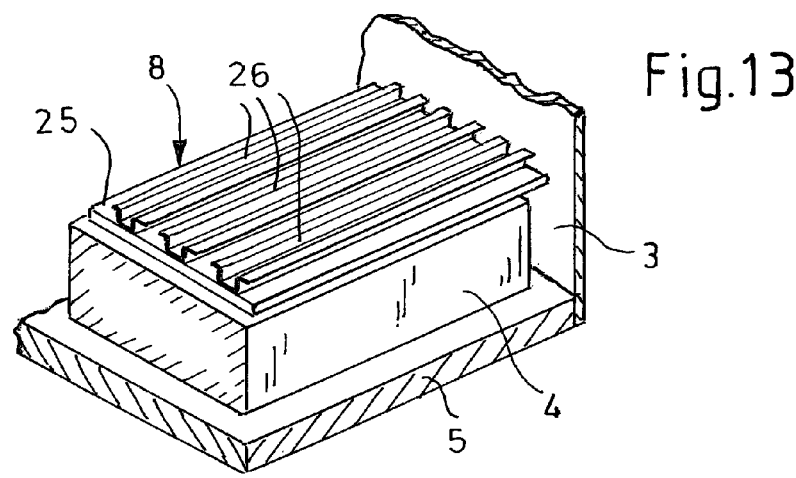
FIG. 13 shows the arrangement of a protective element above the battery, the protective element having both closed and open profile regions with the closed profile regions serving as additional stiffening means.

FIG. 13 shows a further exemplary embodiment of the protective element 8. In this case the protective element 8 consists of a flat plate 25 and stiffening elements 26 that are fastened to the upper side of the flat plate 25. In this exemplary embodiment, the battery 4 is arranged between the floor panel 5 and the flat underside of the panel 25 of the protective element 8.

In the exemplary embodiment shown in FIG. 14, the protective element 8 has a closed cross section in the manner of a box section 27, the battery 4 being arranged between the floor panel 5 and the underside of the box section 27. Self-evidently, a different hollow profile section, for example a tubular section or the like, may be used instead of a box section.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A protection apparatus for a battery having an energy storage device arranged between two wheelhouses comprising:
    a U-beam protective element external to the battery, spanning between the wheelhouses, secured to a floor panel via flanges, defining a continuous surface and a beam width substantially equal to a battery fore-aft width relative to opposing rolling directions of wheels; and
    a plurality of supports secured to the wheelhouses to retain and orient the U-beam above the battery.

2. The apparatus of claim 1, having a rear-located luggage compartment, wherein the energy storage device is arranged in the region of the luggage compartment.

3. The apparatus of claim 1, wherein the U-beam protective element is fixed with regard to its vertical position relative to the wheelhouses.

4. The apparatus of claim 1, wherein the U-beam protective element does not have a force-transmitting connection to the wheelhouses between which it is arranged.

5. The apparatus of claim 1, wherein the U-beam protective element is connected by at least one angle section to the wheelhouses between which it is arranged.

6. The apparatus of claim 1, wherein the U-beam protective element is a sandwich panel.

7. The apparatus of claim 6, wherein the sandwich panel further comprises of two face sheets with a core made of rigid foam.

8. The apparatus of claim 6, wherein the sandwich panel further comprises two face sheets with a core made of corrugated sheet metal, wherein a corrugation line of the core extends transversely relative to a longitudinal axis of the sandwich panel.

9. The apparatus of claim 5, wherein the U-beam protective element is a homogenous profile section which has high resistance to buckling.

10. The apparatus of claim 9, wherein the U-beam protective element has a profile section selected from a group consisting of a closed profile section, an open profile section, or a profile section with closed and open profile regions.

11. The apparatus of claim 1, wherein a central region between two vertical U components of the U-beam protective element is fixed by separate support arms.

12. A battery protection assembly for a battery disposed in a rear storage compartment of a vehicle having an electrically powered motor, the assembly comprising:
    a floor panel of the rear storage compartment, wherein the battery is disposed on the floor panel;
    first and second wheelhouses of the vehicle that are disposed on opposite sides of the battery; and
    a sandwich panel protective member including two face sheets with a core therebetween, extending between the wheelhouses, secured to the floor panel via flanges, defining a continuous surface and a beam width substantially equal to a battery fore-aft width relative to opposing rolling directions of wheels, and disposed above the battery to inhibit displacement of the wheelhouses toward the battery in the event of a lateral load being applied to a side of the vehicle in a collision event.

13. A vehicle battery comprising:
    a rear storage compartment including a floor;
    a pair of wheelhouses disposed on opposite sides of the compartment;
    a battery housing disposed between the wheelhouses;
    an energy storage device disposed within the battery housing; and
    a U-beam spanning between, defining a continuous surface and a beam width substantially equal to a battery fore-aft width relative to opposing rolling directions of wheels, and secured to the wheelhouses with the battery housing being further disposed between the floor and the U-beam, wherein a central region between two vertical U components of the U-beam is fastened to the battery housing.

14. The vehicle battery of claim 13, wherein the U-beam is a sandwich panel comprising two face sheets and a core of corrugated sheet metal therebetween.

* * * * *